United States Patent [19]

Lowery

[11] 3,979,043
[45] Sept. 7, 1976

[54] ALUMINUM BRAZING METHOD

[75] Inventor: Calvin C. Lowery, Huntington Woods, Mich.

[73] Assignee: Wall Colmonoy Corporation, Detroit, Mich.

[22] Filed: Oct. 17, 1975

[21] Appl. No.: 623,437

[52] U.S. Cl.............................. 228/205; 228/208; 228/221; 228/263
[51] Int. Cl.²...................... B23K 1/04; B23K 1/20
[58] Field of Search .......... 228/205, 208, 209, 210, 228/217, 221, 263

[56] References Cited
UNITED STATES PATENTS 3,395,001  7/1968  Stroup et al. .................. 228/208 X
3,482,305  12/1969  Dockus et al. .................. 228/208 X Primary Examiner—Al Lawrence Smith
Assistant Examiner—K. J. Ramsey
Attorney, Agent, or Firm—Harness, Dickey & Pierce

[57] ABSTRACT

An improved method for brazing aluminum and alloys of aluminum in which at least one of the surfaces to be joined is coated with a controlled quantity of metallic manganese which is effective during the high temperature vacuum brazing operation to promote a wetting and flow of the brazing filler metal between the surfaces to be joined and a penetration of the tenacious aluminum oxide film thereon, thereby producing a substantially uniform and high strength bond.

8 Claims, No Drawings

ALUMINUM BRAZING METHOD

BACKGROUND OF THE INVENTION

A continuing problem associated with the brazing of members composed of aluminum and aluminum-base alloys is the presence of a tenacious and thermally stable oxide layer on the surfaces of such members which resists the penetration of the aluminum brazing filler metal, thereby preventing wetting of the base metal and inhibiting flow of the molten filler metal between the surfaces to be joined. While the oxide layer can be satisfactorily removed from the surfaces of such components employing various chemical and mechanical pickling and cleaning techniques, the oxide layer forms almost instantaneously on the cleaned surfaces when exposed to atmospheres containing oxygen even at relatively high vacuum levels. Since the handling of such preliminarily cleaned aluminum components in high vacuum or high purity inert atmospheres is impractical from a commercial standpoint, it has heretofore been proposed to employ various fluxing agents which are effective to dissolve the oxide layer or to etch the metal surface so as to release the oxide in order to facilitate a penetration and wetting of the base metal by the molten brazing filler metal. While the use of such prior art fluxing agents has been found satisfactory in some instances, their use is generally not desirable because of their inherent corrosive nature, necessitating a removal of the residual flux remaining at the completion of the brazing operation by expensive and time-consuming techniques. In some instances, the flux residue is inaccessible due to the nature of the brazed assembly, making it impossible to effectively remove, whereby the brazed component is possessed of properties less than optimum.

In order to overcome the disadvantages associated with the use of prior art brazing fluxes, it has heretofore been proposed to employ a magnesium vapor in the brazing furnace during the brazing operation, whereby penetration of the aluminum oxide film by the brazing filler metal is effected, providing a wetting of the base metal. A method of the foregoing type is disclosed in U.S. Pat. No. 3,378,914. The use of such metallic vapor atmospheres is generally undesirable due to the tendency of the vapors to condense and deposit on cooler portions of the furnace and pumping equipment, causing malfunction and necessitating periodic cleaning of the equipment.

The present invention overcomes many of the problems and disadvantages associated with prior art techniques for brazing aluminum and its alloys, by providing a process which is simple, economical and commercially practical and provides for penetration of the oxide layer, a good degree of wetting of the base metal and a satisfactory flow of the brazing filler metal over a considerable distance along the surfaces of the joint or fracture being brazed.

SUMMARY OF THE INVENTION

The benefits and advantages of the present invention are achieved by a process in which at least one surface of aluminum and aluminum alloy components, which are to be joined, is preliminarily coated with a controlled quantity of metallic manganese, and which on subsequent heating to an elevated brazing temperature in the presence of a substantial vacuum, is effective to promote a penetration of the oxide film by the molten brazing filler metal so as to achieve a wetting of the base metal and the flow of the filler metal between the surfaces to be joined for substantial distances, thereby achieving a substantially uniform and high strength bond or joint. The metallic manganese coating is preferably applied in the form of fine-sized particles suspended in a fugitive binder to one or both of the faying surfaces in the form of a relatively uniform coating so as to provide a total concentration of manganese ranging from about 0.5 up to about 15 milligrams (mg) per square inch. The high temperature brazing operation is carried out in accordance with well known recommended aluminum brazing practices employing a vacuum preferably less than about 0.001 Torr. The surfaces of the aluminum components to be brazed may be preliminarily chemically pickled or cleaned to remove relatively thick adherent oxide coatings or may be simply solvent degreased to remove contaminating substances in those instances where only normal oxide films are present. Further benefits can be achieved in some instances by further employing an aluminum atmosphere box within the vacuum brazing furnace in which the components are placed during the brazing operation.

Additional benefits and advantages of the process comprising the present invention will become apparent upon a reading of the description of the preferred embodiments taken in conjunction with the specific examples provided.

DESCRIPTION OF THE PREFERRED EMBODIMENTS

The process of the present invention is applicable for brazing aluminum and alloys of aluminum capable of being brazed because they have melting points substantially above that of the brazing filler metal employed. The present process employing the metallic manganese coating can be practiced employing recommended procedures and compositions for brazing various aluminum and aluminum alloys for the repair and fabrication of brazed structures possessed of the desired mechanical properties.

The aluminum and/or aluminum alloy members or components to be brazed are subjected to a preliminary cleaning treatment to remove any surface contamination, such as grease, dirt and the like, from the surfaces to be joined. In those instances in which the components are severely oxidized, it is desirable to remove all or a substantial portion of the relatively thick oxide film thereon by a caustic pickling treatment followed by a dilute acid pickling, such as in a dilute nitric acid solution, followed by a water rinse treatment and drying. Alternatively, the surfaces of such components can be mechanically cleaned, such as by supersonic cleaning. In most instances, the components can simply be subjected to a solvent degreasing step to remove organic contaminating substances from the surfaces thereof.

The dried, precleaned surfaces to be brazed are thereafter coated with a layer of manganese in an amount sufficient to react with the superficial aluminum oxide film thereon so as to render the oxide layer penetrable by the molten filler metal to effect a wetting of the base metal, as well as a flow of the molten brazing filler metal over a considerable distance between the faying surfaces to be joined. The use of excessive quantities of metallic manganese is undesirable because of the tendency to form a residual manganese oxide layer between the faying surfaces, which in itself inhibits the wetting action and flow of the molten brazing filler metal. It has been found for most purposes that uniform coatings of metallic manganese ranging from about 0.5 mg up to about 15 mg per square inch of joint area is satisfactory with the higher concentrations being applicable for the brazing of components having heavier or thicker oxide layers on the surfaces thereof. For most purposes, uniform coatings of the metallic manganese at a range of about 1 up to about 5 mg per square inch, and particularly about 2 mg per square inch, are satisfactory.

While a coating of manganese can be applied to each of the opposed surfaces defining the braze joint, satisfactory results can also be attained by applying the coating to only one surface over a region coextensive with the joint area. In either event, the quantity of manganese in the intervening layer or coating between the joint surfaces is controlled within the permissible concentration range as hereinbefore set forth.

While the coating of metallic manganese can be applied to the surfaces to be joined by electroplating, vapor deposition, and in the form of a very thin metallic foil, it is preferred for practical and economic considerations to apply the manganese coating in the form of a fine-sized powder in the presence of a fugitive organic binder which retains the particles on the faying surfaces during the handling of the components and during the preliminary stages of the brazing operation. The fugitive binder may comprise any of those known in the art which are compatible with the aluminum or aluminum alloys to be joined, the brazing filler metal employed, as well as the metallic manganese powder itself. The fugitive binder is further characterized as one which is adapted to volatilize and/or thermally decompose at the elevated temperatures present during the brazing operation without leaving any appreciable residue which otherwise would adversely affect the mechanical properties of the joint obtained. Fugitive binders of the foregoing type typically include resins such as acrylic resins, acrylic acids, polyvinyl alcohol, etc., which are adapted to be dissolved in a volatile solvent providing a binder solution containing from as low as about 5% to as high as about 50% resin on a solids basis.

The metallic manganese powder may be of a regular or irregular particle configuration and is controlled so as to be of an average particle size less than about 150 mesh (104 microns), and preferably less than 325 mesh (44 microns). Particularly satisfactory results are obtained with powders of an average particle size less than about 400 mesh (38 microns). An appropriate quantity of the manganese powder is admixed with the binder solution to provide a coating composition of a desired viscosity so as to enable an application thereof to one or both of the faying surfaces, such as by brushing, printing, rolling, spraying or the like. Preferably, the coating formulation is formulated so as to provide a brushable consistency and is applied by brushing in the form of a uniform layer which is a substantially monoparticulate layer of metal particles retained in a continuous adherent film of the dried fugitive binder composition.

The coated components are thereafter assembled in accordance with known procedures and placed in a vacuum brazing furnace. The brazing filler metal is applied in the region of the surfaces to be joined in the form of a powder, wire or the like, and may suitably be retained in position by use of the same fugitive binder employed for applying the metallic manganese powder coating. The vacuum brazing of the components is effected in accordance with known recommended procedures by which the temperature is elevated in the presence of a vacuum preferably less than 0.001 Torr and preferably at a vacuum less than 0.0001 Torr so as to effect a melting of the brazing filler metal, which in the presence of the manganese coating is effective to penetrate the oxide film on the surfaces to be joined, effecting a wetting of the base metal and a flow between the surfaces to be joined, producing a substantially uniform and high strength bond. The specific mechanism by which the metallic manganese is effective to cause a rupture of the oxide layer and a penetration thereof by the molten filler metal is not entirely understood at the present time. One possible explanation is that the metallic manganese reacts with the aluminum oxide layer in a vapor or solid state reaction to produce a spinel-type ceramic having a different volume than the original oxide coating which produces cracks or ruptures in the oxide coating, enabling the molten filler metal to penetrate to the base metal. It will be understood that the accuracy or validity of the mechanism as hereinabove theorized forms no part of the present invention and is merely offered as a possible explanation as to the manner by which the benefits of the present invention are attained.

The resultant brazed component, after cooling, is characterized as having a substantially uniform, high strength joint along the braze line. The use of minimal quantities of manganese at the braze connection does not significantly alter the alloy chemistry of the brazing filler metal and the resultant brazed connection.

In order to further illustrate the practice of the present invention, the following example is provided. It will be understood that the example is provided for illustrative purposes and is not intended to be limiting of the scope of the invention as herein defined and as set forth in the subjoined claims.

EXAMPLE

Sheared aluminum alloy test strips having a width of about ⅜ inch, a length of about 4 inches and a thickness of about 1/16 inch, are prepared from an aluminum alloy designated as Alcoa alloy 6061 having a nominal analysis of 0.25 copper, 0.6 silicon, 1.0 magnesium, 0.25 chromium and the balance essentially aluminum. A brazing filler metal recommended for brazing the aforementioned alloy is employed comprising Alcoa No. 718 in the form of a brazing wire having a nominal composition of 12.0% silicon, 0.3% copper, 0.8% iron, 0.20% zinc, 0.10% magnesium, 0.15% manganese, and the balance essentially aluminum.

A series of the test strips are preliminarily cleaned by subjecting them to a sodium hydroxide aqueous pickling treatment followed by a dilute nitric acid treatment, followed by a water rinse treatment. Two of the preliminarily cleaned test strips without any manganese coating are assembled in the form of a stringer having a T-shaped cross section and an appropriate quantity of a section of brazing wire is applied adjacent to the surfaces to be joined employing a fugitive binder.

A second set of test strips are coated in the region of the surfaces to be joined with a brushable solution containing a volatile fugitive binder incorporating metallic manganese particles of an average particle size of about 35 microns. The metallic manganese powder composition is applied by brushing so as to provide a concentration of about 2 mg per square inch of braze joint. A similar quantity of brazing wire is applied in the region of the joint surfaces and adhered thereto by means of a fugitive binder.

The uncoated and coated test specimens are placed in an aluminum atmosphere box in a vacuum furnace and the furnace is evacuated to a vacuum less than 0.0001 Torr and the temperature raised to about 1120°F, which is the recommended brazing temperature range of the base-filler metal combination. At the completion of the brazing operation, the furnace is cooled and the uncoated brazed assembly or blank, as well as the brazed assembly having a preliminary metallic manganese coating thereon, are removed and inspected. An inspection of the joint formed in the uncoated blank reveals a fair flow of filler metal with limited joint formation in the region where the filler metal was applied. In comparison, the manganese coated assembly, in accordance with the practice of the present invention, reveals a strong uniform joint along the entire faying surface, indicating good flowability and penetration of the filler metal over the surfaces to be joined.

While it will be apparent that the invention herein described is well calculated to achieve the benefits and advantages set forth above, it will be appreciated that the invention is susceptible to modification, variation and change without departing from the spirit thereof.

What is claimed is:

1. A method of brazing members composed of aluminum and alloys of aluminum which comprises the steps of applying a substantially uniform coating of metallic manganese to at least one of the surfaces of the members to be joined in an amount sufficient to react with the aluminum oxide film on said surfaces to enable a penetration of said oxide film by a molten brazing filler metal and a wetting of the underlying base metal substrate, applying a brazing filler metal to the member in the region of the surfaces to be brazed, heating the member to an elevated brazing temperature in the presence of a vacuum of at least about 0.001 Torr to effect a melting and flow of said brazing filler metal between the surfaces to be joined and a penetration and wetting of the substrate base metal beneath the oxide film, and thereafter cooling and extracting the brazed said member.

2. The method as defined in claim 1, in which said coating of metallic manganese is applied so as to provide a concentration of from about 0.5 mg up to about 15 mg manganese per square inch between said surfaces to be joined.

3. The method as defined in claim 1, wherein said coating of metallic manganese is applied so as to provide a concentration of manganese between said surfaces to be joined within a range of about 1 mg up to about 5 mg per square inch of joint surface area.

4. The method as defined in claim 1, including the further step of subjecting the surfaces of said members to a precleaning treatment to remove contaminating substances from the surfaces thereof prior to the step of applying said coating of metallic manganese thereto.

5. The process as defined in claim 1, wherein the step of applying said coating of metallic manganese to at least one of said surfaces is performed by applying a finely-particulated manganese powder in a fugitive binder to said surface in the form of a substantially uniform adherent film.

6. The method as defined in claim 5, in which said powder is of an average particle size less than about 150 mesh.

7. The method as defined in claim 5, in which said powder is of an average particle size less than about 325 mesh.

8. The method as defined in claim 1, including the further step of placing said members within an aluminum box prior to the heating of said members to the elevated brazing temperature.

* * * * *